United States Patent Office 3,526,944
Patented Sept. 8, 1970

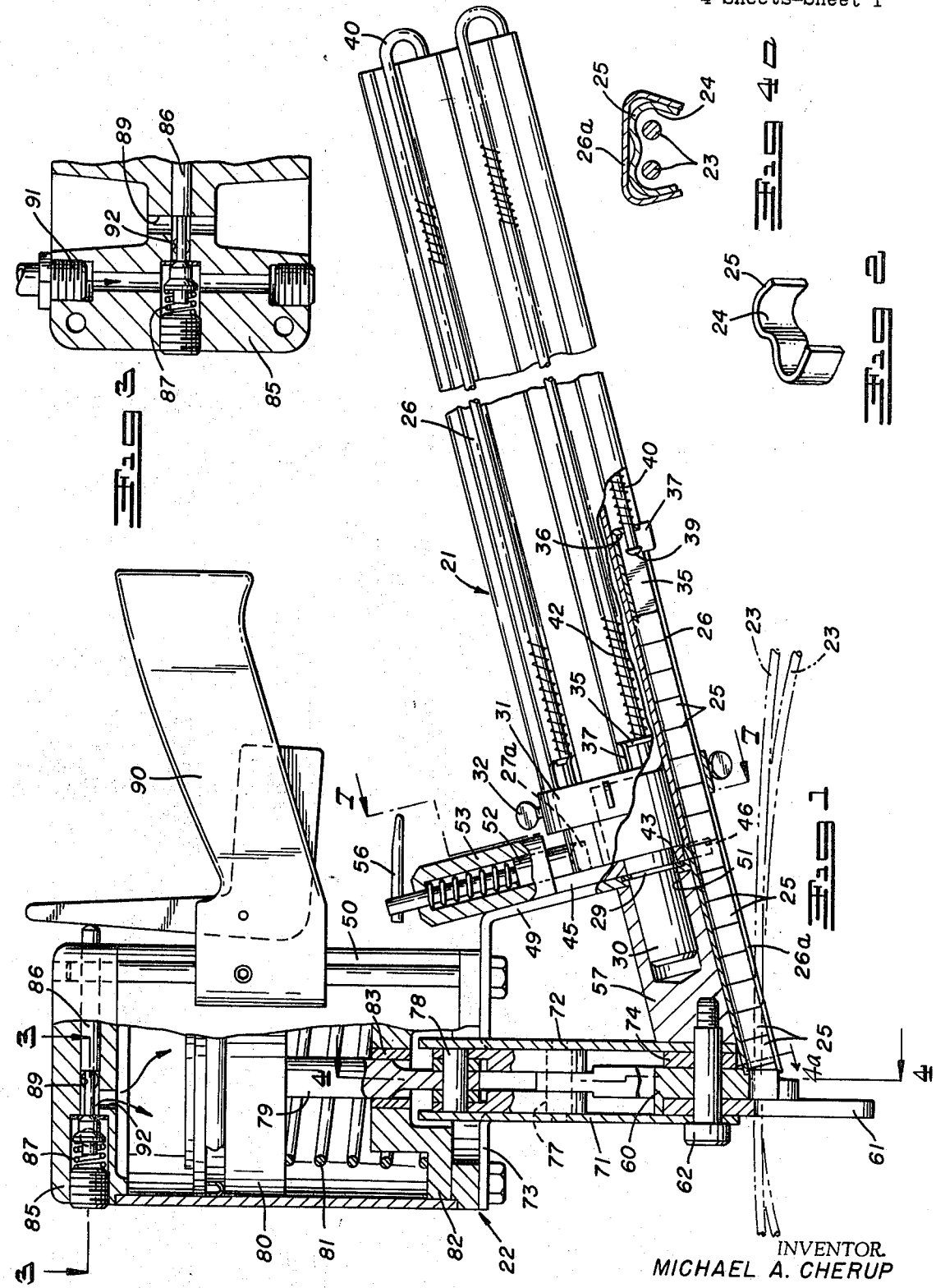

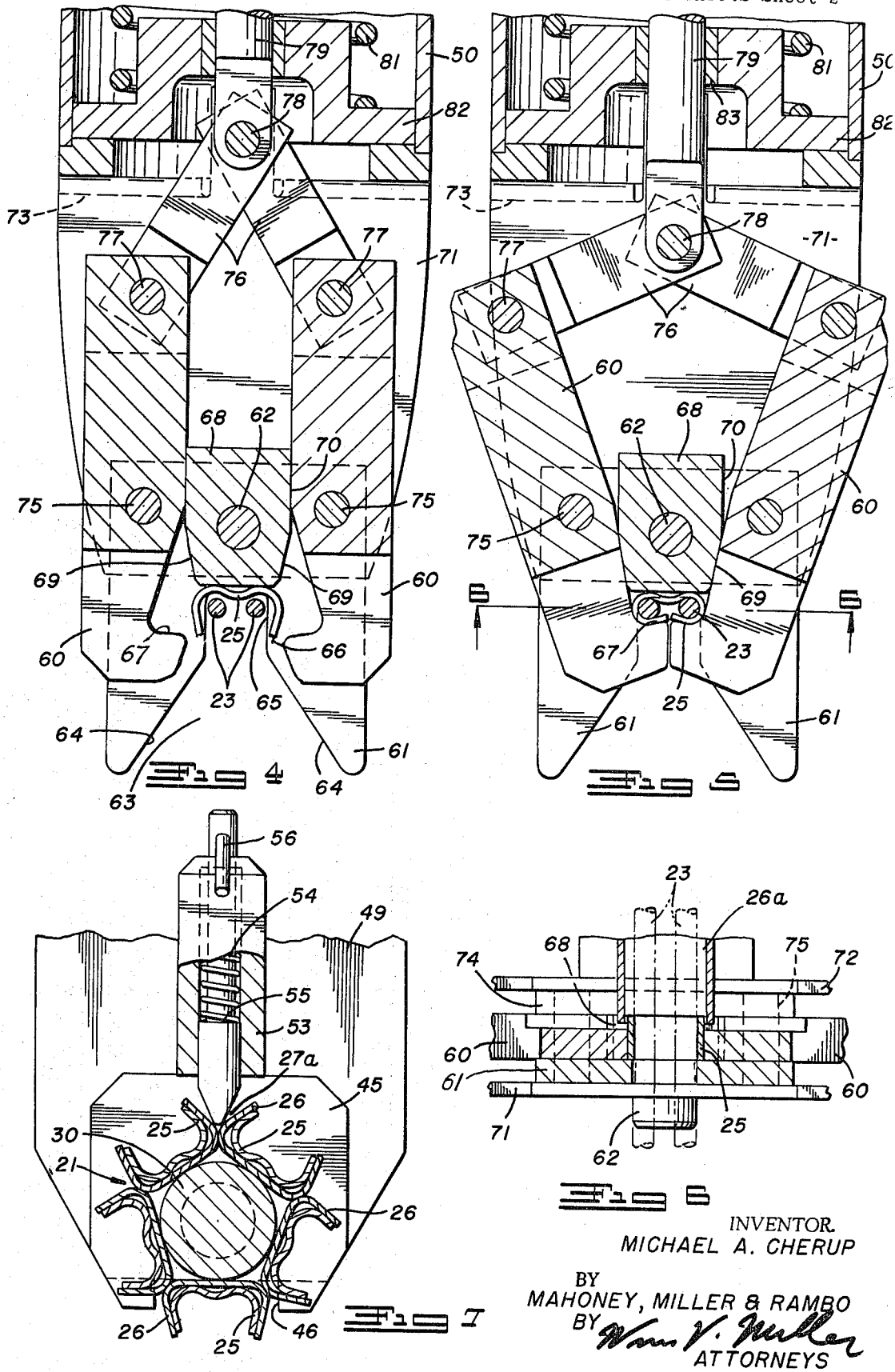

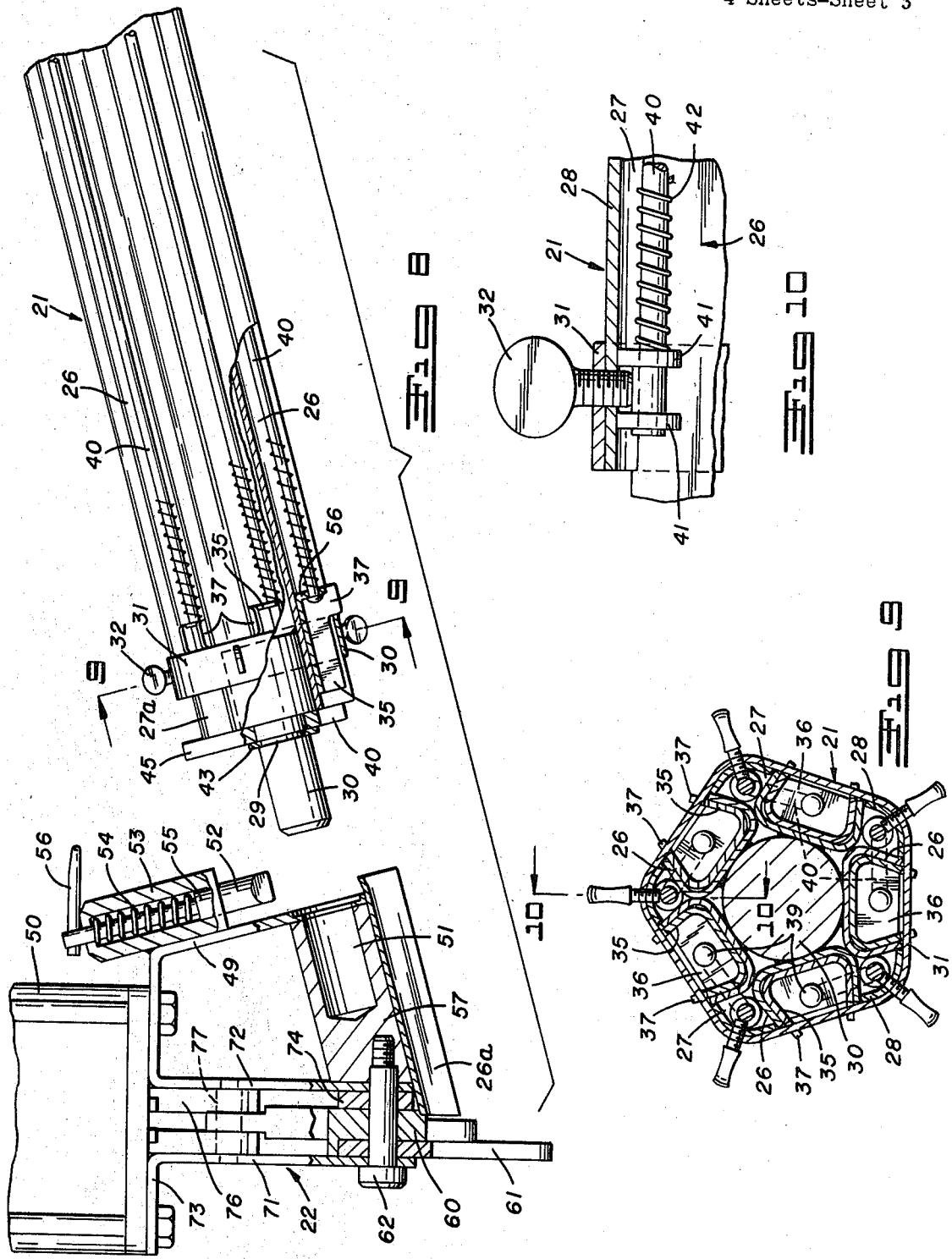

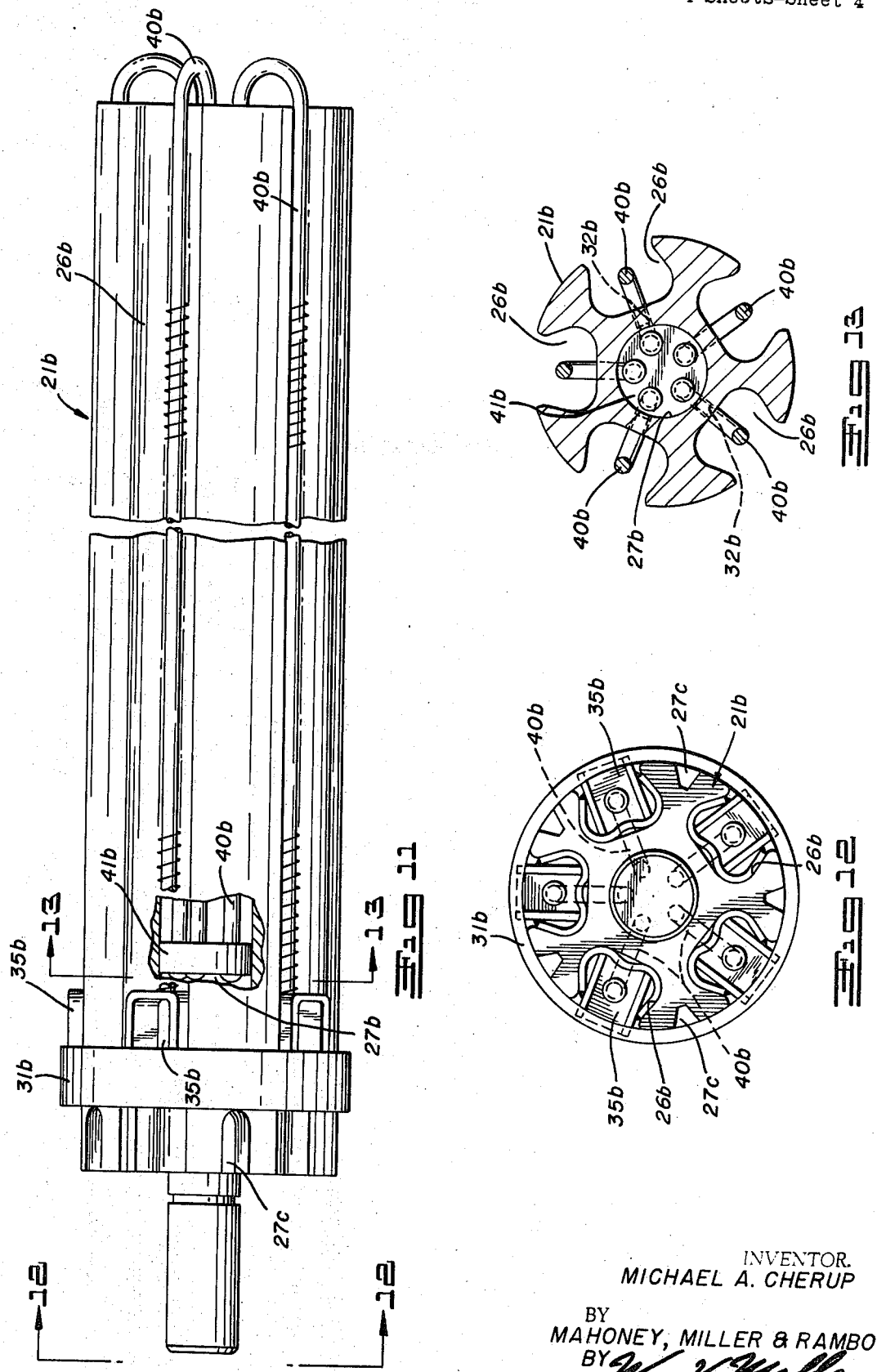

3,526,944
CLIP SUPPLYING AND CLINCHING TOOL
Michael A. Cherup, Columbus, Ohio
(2895 NE. 33rd Court, Fort Lauderdale, Fla. 33306)
Filed June 21, 1967, Ser. No. 647,785
Int. Cl. B23q 7/10; B23p 11/00
U.S. Cl. 29—212
10 Claims

ABSTRACT OF THE DISCLOSURE

A tool is provided for clinching or crimping an open-sided staple or clip around a work element. A set of normally open or expanded crimping jaws receives uncrimped clips from a barrel-type magazine through an intermediate interconnecting feed chute at the location where the clips are crimped around the work element through closing or contracting operation of the jaws. The feed chute and a stop plate cooperatively positioned at the jaws retain an uncrimped clip between the jaws when the jaws are in an expanded configuration. The jaws, when expanded, are of a configuration to receive an uncrimped clip at this location with the open side of the clip substantially unobstructed for readily receiving the work element and the jaws, when contracted, deform the clip in a crimping operation to a configuration which will be released from the feed chute when the jaws are again expanded. A guide mechanism disposed in cooperative relationship to the jaws assists in positioning of a work element between the jaws and within an uncrimped clip positioned between the jaws. The magazine for the clips comprises several elongated barrels revolvable about a longitudinal axis to sequentially bring each barrel into alignment with the feed chute with the feed chute and barrel angularly disposed relative to the jaws to avoid interference to engagement of the jaws and a clip with a work element and disengagement of the jaws from a clip crimped about a work element.

---

The invention comprises a novel magazine and supplying unit which cooperates in a special manner with a novel crimping unit. The magazine and supplying unit will contain a supply of the clips and will feed them directly into association with the two adjacent members or elements which are to be secured together and which have been fed into cooperating crimping jaws which are a part of the crimping unit. Before crimping, the expanded clip is of such a configuration in association with the adjacent two members in the crimping jaws that it is retained in that position, but when the jaws are actuated, the clip is crimped or contracted around the adjacent members, and the clip is then of a configuration to permit removal of it with the secured members as an assembly from the jaws. The magazine is of the turret type so that it can receive and retain several columns or rows of the clips which can be successively indexed relative to the crimping unit to supply such unit.

The principles of this invention are illustrated in the accompanying drawings in which:

FIG. 1 is a side elevational view, partly broken away, of the tool of this invention including the clip-holding and supplying magazine and the clip-receiving and crimping unit.

FIG. 2 is a perspective view illustrating the type of clip which may be supplied to the tool.

FIG. 3 is an enlarged transverse sectional view taken along line 3—3 of FIG. 1 through an actuating air motor of the crimping unit.

FIG. 4 is an enlarged sectional view through the crimping unit taken along line 4—4 of FIG. 1 showing a clip in expanded condition in position in the expanded crimping jaws.

FIG. 4a is an enlarged sectional view taken along line 4a of FIG. 1, showing the uncrimped clip in the feed chute.

FIG. 5 is a view similar to FIG. 4 but showing the crimping jaws moved to crimp or close the clip.

FIG. 6 is a transverse sectional view taken along line 6—6 of FIG. 5 through the jaws.

FIG. 7 is a transverse sectional view taken along line 7—7 of FIG. 1 showing the turret magazine indexing means.

FIG. 8 is a view partly in side elevation and partly in section showing the clip-holding and supplying magazine unit separated from the clip-crimping unit but indicating how they are to be cooperatively connected.

FIG. 9 is a transverse sectional view taken along line 9—9 through the inner end of the magazine.

FIG. 10 is an enlarged detail in section taken along line 10—10 of FIG. 9.

FIG. 11 is a side elevational view, partly broken away, showing a different form of turret-type magazine.

FIG. 12 is an end elevational view of the magazine taken from the position indicated at line 12—12 of FIG. 11 at the inner end.

FIG. 13 is a transverse sectional view tagen along line 13—13 of FIG. 11.

With specific reference to the drawings, in FIG. 1 there is illustrated an assembly of units in which the present invention may be embodied and which comprises mainly the clip-holding magazine and supplying unit 21 and the clip-receiving and crimping unit 22. These units are also illustrated generally in FIG. 8 separated and spaced from each other but in alignment to be brought together.

A specific staple or clip 25 which may be supplied to the tool assembly is illustrated in FIG. 2 but, as indicated previously, the tool is not limited to use with this specific clip. This clip is shown as being of sheet metal and is mainly of U-form but is provided with separate channels or cradles 24 disposed side-side-side for receiving the parallel wires 23 which are to be clipped together. Also, it will be noted that the sides or arms of the clip converge to a predetermined extent toward the open side of the clip so that the clip is of greater width toward its closed side. As indicated above, the clips crimped by the tool may be applied to elements or members other than the wires 23 indicated which are given only as an example. The magazine unit 21 is so mounted on and connected to the crimping unit 22 that the wires 23 can be fed directly into the unit 22 and the clips 25 can be fed directly into that unit in straddling relationship to the wires in position for crimping thereabout by actuation of the unit 22.

The unit 21 is of the turret type and is preferably formed to provide five barrels 26 in which rows or columns of the clips or staples 25 are disposed. This unit is illustrated best in FIGS. 1 and 7-10. The barrels are in the form of outwardly opening longitudinally extending, parallel disposed channels 26, preferably of sheet metal, and may be provided in the desired number which is indicated as five but may be varied and are arranged in a group around a central longitudinal axis in contact with each other and suitably secured together as by welding along their longitudinally extending contacting portions. The channel members 26 are substantially U-shaped in cross section but the sides slightly converge to provide in effect an undercut groove which is of proper form to receive the clips and interfit with them to prevent them from dropping out of the channel. Between the side walls of adjacent outwardly opening channels 26, there is formed a housing or passage space 27 extending longitudinally thereof and the outer side of which is closed by a transversely curved shield 28 which is turned inwardly and extends longitudinally substantially the full length of the adjacent channels 26 and to the outer edges of the side walls of which it is secured as by welding. This assembly of sheet metal members is grouped around a stub shaft or mounting stud 30 at its inner end and the channels 26 may also be welded to the circumference thereof as indicated in FIG. 9. This stud is provided with a reduced outer extension which has an annular recess or groove 29 formed therein close to the lower end of the assembly. Also, as indicated in this figure, the sheet metal magazine assembly is surrounded by a metal band 31 which carries a plurality of wing-type setscrews 32 which are threaded into tapped openings formed therein and extending through aligning openings in the shields 28 so that the inner end of each screw projects into a corresponding space 27 between adjacent channels 26. It will be noted from FIGS. 7 and 8 that the shields 28 terminate at the forward edge of the band 31 to provide outwardly opening sockets or notches 27a between the leading ends of the channels 26.

The clips 25 are inserted in the individual channels 26 in groups, rows or columns of U-cross section and which consist of large numbers of the clips disposed in edge-to-edge contact in the usual manner of groups of staples and usually are adhered together by a suitable adhesive. These clips are fed forwardly or inwardly along the channels 26 by means of the slides 35, one of which is mounted in each channel 26. Each slide 35 is of a cross-sectional shape complemental to the channel 26 in which it is slidably disposed and is of the same size and shape as a clip 25. Thus, it is mainly of U-cross section and turned outwardly and is open at its leading edge but is provided with a transverse wall 36 at its trailing end. In addition, at this trailing end, it is provided with stop lugs or ears 37 on its side walls which project outwardly farther than the adjacent side walls of the channel 26 so that they will contact with the band 31 (FIG. 8) to limit advancing or feeding movement of the slide. Each slide is slidably mounted on one end of a substantially U-shaped plunger rod 40, this end being at the one leg of the rod which is disposed in channel 26 and extends longitudinally therethrough. The rod extends slidably through the wall 36 of the slide 35 which has the stop head 39 on that end. The rod 40 extends around the outer or rear end of the channel and then forwardly through an adjacent passage 27 and this leg of the rod is provided with axially spaced annular shoulders 41 (FIG. 10) between which the inner end of one of the screws 32 extend. This locks the U-shaped rod 40 in the indicated position. The rod receives a compression type spring 42 which is designed to push the slide 35 and cause it to eventually advance to the position shown in FIG. 8 to feed all the clips 25 from the channel 26. The use of the U-shaped rods 40 provides for greater capacity of clips in each channel 26 since when initially loaded the spring can be compressed over onto the other leg of the rod.

A plate 45 (FIGS. 7 and 8) is mounted on the shaft 30 for rotation at the inner or forward end of the magazine assembly and is retained in that position by a snap ring 43 which fits into the annular groove 29. The plate will be rotatable but will normally be held in a set position by the friction exerted by the ring 43 and the adjacent end of the magazine assembly even when the magazine unit 21 is separated from the unit 22 as shown in FIG. 8. The plate 45 is of such a shape that it ordinarily (FIG. 7) will block the forward or outlet end of all the channels 26 except the lowermost one but at this point it is provided with a notch 46. However, the plate can be rotated about the axis of the shaft to even block the outlet end of this lowermost channel 26 as well as all the other channels. This is desirable when all the barrels or channels 26 of the magazine assembly are to be loaded which is usually done at the time the magazine unit 21 is removed from the unit 22. At this time, each slide 35 will be retracted as far as possible and a row of the clips 25 will be inserted in the channel ahead of the slide. The forward end of the row will then engage the plate 45 and will not feed from the channel.

The unit 21 is mounted on the unit 22 by the means illustrated best in FIGS. 1 and 8 and which includes an inverted U-shaped bracket 49 that is bolted to and depends from the fluid motor 50 of the unit 22. This bracket 49 carries a block member 57 which is provided with a bearing socket 51 which opens outwardly and upwardly relative to the axis of the motor 50 and which is adapted to rotatably receive the stud 30 to mount the magazine unit 21 on the unit 22 for relative rotation. The bracket 49 also carries an indexing and locking mechanism which is in the form of a locking plunger 52 that is mounted on a sleeve-like housing 53 carried by the bracket. When the unit 21 is mounted on the unit 22, the lower end of the housing 53 engages the upper, straight edge of the plate 45 (FIG. 7) and will prevent rotation thereof so that the notch 46 will be aligned with the lowermost channel 26. A compression spring 54 in the housing 53 around the plunger engages a shoulder 55 on the plunger and normally biases it outwardly of the housing so that its outer end will, as indicated in FIGS. 1 and 7, project into a selected notch 27a. The extremity of the plunger may be wedge-shaped to index the magazine assembly as it is rotated to selected positions about the axis of the stud 30. The opposite end of the plunger may be provided with a handle 56 to facilitate withdrawal from a notch 27a to permit selective rotation of the magazine to permit positioning of the desired barrel at the lower side or in clip-feeding position which is shown in FIG. 1. It will be noted that the block member 57 is angularly disposed on the unit 22 relative to its axis and extends between the depending parts of the bracket 49. Along the lower side of this block 57 is a channel form feed chute or passageway 26a which is a continuation of each channel 26 of the magazine when it is indexed into coaxial alignment in its lowermost position. When the feed chute 26a is in alignment with a channel 26, the clips 25 will be forced from the channel 26, by the action of the slide 35, into the chute 26a and advanced through that chute, since as previously indicated, the notch 46 of the plate 45 will permit the adjacent ends of the channel 26 and chute 26a to be in cooperative relationship. The clips 25 will not drop downwardly from the chute through the open side because, as shown in FIG. 4a, in uncrimped condition they interfit with the side walls of the chute 26a. The clips 25 fit in the channels 26 in the same manner, as previously indicated, so that they will not drop from the downwardly-opening lowermost channel of the magazine but will be moved therealong by the pushing slide 35. Thus, the magazine may be indexed to bring the successive channels 26 in alignment with the feed chute 26a.

From the chute 26a, the clips 25 feed between a pair of movable crimping jaws 60, as shown best in FIGS. 1 and 4, and into contact with a fixed stop plate 61 on the far side of the jaws. The plate 61 is bolted in a fixed position to the outer end of the block 57, carried by the bracket 49, by means of a bolt 62 (FIGS. 1 and 8). The plate is provided with a notch 63 at its lower side which is formed to direct the members or wires 23 upwardly into position between the jaws 60 to receive the clip 25 to be fastened thereto. This notch has a wide outer mouth portion with inwardly converging angled edges 64 and an inner narrow throat portion with parallel edges 65. This throat portion is of less width than the clip 25 so that the clip will be stopped by the plate, as shown in FIG. 4. At this time, the clip will be supported by the feed chute 26a in cooperation with the stop-plate 61 between the jaws 60 which will be in expanded position. It will be noted that the space between the stop-plate 61 and the adjacent terminal end of the feed chute 26a is less than the depth of a clip (FIGS. 1 and 6) and adjacent marginal end portions of a clip and the feed chute will overlap resulting in retention of the uncrimped clip by the feed chute in cooperation with the stop-plate. Each of the jaws 60 is provided with an inwardly turned hook-shaped lower end which has a clip engaging shoulder 66 and a curved clip-forming or crimping surface 67. When the clip is engaged by the shoulders 66 (FIG. 4) its upper or closed side is positioned in engagement with an anvil member 68 (see FIGS. 4 and 5) which is disposed between the movable jaws 61 and is fixed in position by the bolt 62. The member 68 is provided with converging lower edge portions 69 and straight upper edge portions 70. The portions 70 will be engaged by the upper straight portions of the jaws 60 when they are in parallel condition (FIG. 4) and the jaws 60 are in expanded position. However, the tapered lower converging edges 69 permit movement of the jaws 60 together into crimping position (FIG. 5).

The jaw assembly comprising the jaws 60, the plate 61, and the member 68 is carried by the bolt 62 between the spaced parallel plates 71 and 72, as shown in FIGS. 1 and 7. The plate 72 is part of the bracket 49 and the plate 71 is part of a bracket 73 which is bolted to the fluid or air motor 50. Between the jaws 60 and the plate 72 in a spacer 74 and it will be noted that the feed chute 26a extends beyond this spacer to the plane of the jaws. The jaws are disposed for swinging movement between the plates 71 and 72 by being pivoted by the pins 75 (FIG. 4) which extend through the fixed plate 61 at its upper corners. The straight upper ends of the jaws 61 are pivoted to the outer ends of a pair of toggle-type actuating links 76 by the respective pivot pins 77, the links also being located between the plates 71 and 72. The inner ends of the links are pivoted by a common pivot 78 to the outer end of a piston rod 79 which is carried by a piston 80 that is reciprocably mounted in the cylinder of the air motor 50. The motor 50 is of the single-acting type and is normally biased into a position where the jaws 60 are spread by means of a spring 81 which is disposed within the cylinder and pushes against the piston 80 to move into engagement with the end of the cylinder which is the upper end in FIG. 1. The lower end of the cylinder is provided with a head 82 which serves as a stop for the piston and a bearing and guide for the rod 79 which is slidable in a bushing 83 carried thereby. When air is supplied at the outer or upper end of the cylinder, it moves the piston downwardly or outwardly and actuates the jaws 60 through the toggle links 76. The jaws 61 move inwardly to engage the clip 25, as shown in FIG. 5, and to cooperate with the anvil member 68 to crimp the clip 25 around the wires 23. The crimped assembly can now be withdrawn from between the jaws and through the throat of the plate 61.

The air motor 50 is actuated by an air control valve 85 (FIGS. 1 and 3) which is mounted in the head at the upper end of the cylinder. This valve is provided with a plunger 86 which is normally biased into closed position by a spring 87 but which can be unseated against the force of the spring by means of a trigger and handle arrangement 90 carried by the cylinder. Normally the upper portion of the cylinder is vented through a vent 89 but this vent is covered by the plunger 86 when it is actuated by the trigger and the supply line 91 is then connected to the inlet 92 which leads into the upper end of the cylinder.

It will be noted from FIG. 1 that the feed chute 26a is inclined relative to the transverse plane of the jaws 60 and this permits positioning the wires 23 between the jaws and the clip 25 positioned therebetween ready to be crimped around the wires. Thus, the clip is fed directly to its point of application between the crimping jaws and is positioned between the jaws 60 for crimping around the wires. Then the assembly can be moved on out of the jaws. An adequate supply of clips will be provided by the several barrels of the magazine 21 which can be successively indexed relative to the feed chute 26a of the unit 22. Furthermore, the design of the magazine barrels and the associated slides 35 and rods 40 is such that the magazine will have a great capacity and will effectively feed the clips from any selected barrel to the crimping jaws.

In FIGS. 11 to 13, inclusive, there is illustrated a somewhat modified form of magazine unit. In this case, all the barrels 26b may be formed in an extruded metal member 21b instead of being formed as a sheet metal assembly. The rods 40b are again U-shaped, but one leg of each rod extends into a central chamber 27b. The inner ends are anchored to a central collar 41b which is disposed within the forward end of the central chamber 27b and is removably fixed therein by the setscrews 32b. The stop collar 31b is provided as before for limiting advance movement of the clip-feed slides 35b. Also, the forward end of the magazine member 21b is provided with the indexing notches 27c. This magazine unit, when mounted on the crimping unit 22, will function substantially the same as the magazine unit 21 previously described.

Many advantages of this tool assembly have been discussed and others will be readily apparent. However, it should be stressed that with this tool, the clips are successively fed directly into the crimping or clinching jaws when they are in expanded position and that the work element, the two wires in the specific example, is fed directly into position within the jaws to receive the clip crimped thereby. After the jaws are contracted to apply the clip to the receiving element, the work assembly can be advanced through the expanded jaws. Thus, by a successive feed of the work element, the tool functions to receive and apply the clips at successively spaced intervals along the element.

Having thus described this invention, what is claimed is:

1. A tool for crimping U-shaped clips having an open side around an associated work element to produce a work assembly comprising a crimping unit including movable crimping jaws which are normally expanded to receive a clip in association with the element to which it is to be applied, means for engaging and facilitating directing the element between said jaws and the clip to a position between said jaws and means for positioning a clip between said jaws to receive the element in cooperation with said jaws, said last-named means including a feed chute having a U-shaped cross-section complemental to the clips and having an open side for receiving the clips successively from a supply and feeding them directly into position between said jaws with the work element passing through the open side of said chute and clips positioned therein, and means for actuating said jaws to contract them around the clip and apply it to the element with the applied clip configured to pass laterally through the open side of said feed chute.

2. A tool according to claim 1 in which said feed chute is of undercut U-shaped cross-section to receive the clips which are of complemental interfitting U-shaped cross-section so that they will not drop out of said chute through the open side thereof, said jaws being disposed in a plane angularly transverse of said chute and at an outlet end thereof, said chute being relatively divergent to a work element disposed in said jaws to permit feed of an elongated work element through the outlet end of said chute and said jaws.

3. A tool according to claim 2 comprising a magazine having a body including a plurality of longitudinally extending clip-holding barrels disposed around a central longitudinal axis, which is disposed parallel to a longitudinal axis of said feed chute, means for mounting said magazine on said crimping unit for rotation about said axis to bring said barrels successively into a position of coaxial alignment with said chute, to permit passage of clips from said aligned barrel into said chute and means for indexing said magazine in its successive positions of rotation.

4. A tool according to claim 3 in which the barrels in said magazine are of the same cross-sectional shape as said feed chute so that the clips will not drop therefrom when the barrels are turned downwardly, each of said barrels being provided with a feed slide for moving the clips therethrough towards an outlet end which is adapted to be brought into alignment with an inlet end of said chute.

5. A tool according to claim 4 in which each said slide is slidably mounted on a respective U-shaped rod which has one leg extending through the barrel and another leg positioned in a chamber formed in the body of said magazine and extending parallel to said bore, said leg carrying a spring which biases said slide toward the outlet end of the barrel.

6. A tool according to claim 5 in which said magazine barrel is provided with a stop band surrounding the barrels thereof adjacent the outlet ends thereof which engages portions of said slides to limit movement toward said outlet ends.

7. A tool according to claim 3 in which said indexing means comprises a locking plunger carried by said crimping unit, and indexing sockets disposed around the body of said magazine for selectively receiving said plunger.

8. A tool according to claim 1 in which said jaws are mounted for swinging movement in a plane toward and from each other and are each formed with an inwardly turned, hook-shaped lower end having shoulders and crimping surfaces to cooperatively receive a clip when said jaws are expanded and engaging a clip when said jaws are contracted to crimp a clip around an element to a configuration to pass out of said feed chute when said jaws are expanded.

9. A tool according to claim 8 which includes a fluid actuated motor and in which said jaws are pivotally mounted and connected by toggle linkage to said fluid motor for actuation thereof.

10. A tool according to claim 9 in which said fluid motor comprises a piston having a rod extending through a head at one end thereof and connected to said linkage, said rod being slidably mounted in a guide and bearing carried by said head.

References Cited

UNITED STATES PATENTS

| 2,879,512 | 3/1959 | Tipper | 29—211 |
| 2,929,069 | 3/1960 | Christin | 29—212 |
| 2,968,042 | 1/1961 | Yankee | 29—212 |
| 3,237,290 | 3/1966 | Frank | 29—243.57 |
| 3,381,359 | 5/1968 | Schroeder | 29—212 |

THOMAS H. EAGER, Primary Examiner

U.S. Cl. X.R.

29—243.57; 221—105